Jan. 9, 1962 R. CROUTHAMEL 3,015,874

METHOD FOR FABRICATING SEMICONDUCTOR DEVICES

Filed April 4, 1958 3 Sheets-Sheet 1

INVENTOR.
RICHARD CROUTHAMEL

BY

AGENT

Jan. 9, 1962 R. CROUTHAMEL 3,015,874

METHOD FOR FABRICATING SEMICONDUCTOR DEVICES

Filed April 4, 1958 3 Sheets-Sheet 2

INVENTOR.
RICHARD CROUTHAMEL
BY
Carl H. Symmedwatt
AGENT

INVENTOR.
RICHARD CROUTHAMEL
BY
Carl H. Synnestvedt
AGENT

United States Patent Office 3,015,874

Patented Jan. 9, 1962

3,015,874

METHOD FOR FABRICATING SEMICONDUCTOR DEVICES

Richard Crouthamel, Telford, Pa., assignor to Philco Corporation, Philadelphia, Pa., a corporation of Pennsylvania Filed Apr. 4, 1958, Ser. No. 726,582
5 Claims. (Cl. 29—25.3)

This invention relates generally to improvements in the art of fabricating semiconductor devices, and more particularly to a unique method of and apparatus for assembling constituent elements of such devices, the present application being a continuation-in-part of my copending application bearing Serial No. 651,967, filed April 10, 1957, now abandoned.

While this invention has broader applicability, it has found particular utilization in the fabrication of alloy junction transistors and will be illustrated and described with especial reference to that field of application.

The practice with regard to the assembly of elements comprising transistors made by the alloying or diffusion type process is manually to assemble the individual elements ultimately constituting the transistor, in a graphite jig, commonly referred to as a "boat." This boat, through the agency of suitably positioned nests or cut-outs, acting in cooperation with positioning templates, serves approximately to orient the respective elements in predetermined alignment preliminary to the alloying phase which integrates the constituent members. This assembling technique, which has been adopted throughout the industry has, however, serious shortcomings, in that the entire assembly operation is carried out manually, and is both time consuming and costly. Further, in order to accommodate dimensional variations existing between similar elements going into the fabrication of successive units, and to promote ease of assembly, the jigs and fixtures are made oversize thereby giving rise to considerable variation in the physical parameters of the finished product, resulting in variations in the electrical characteristics of the completed transistors.

The mode of fabrication just described obviously does not allow for optimum registration between transistor elements preparatory to alloying. Moreover, the use of such a method to produce large quantities of transistors requiring substantially identical operating characteristics, necessitated by the present wide acceptance of semiconductor devices in both military and industrial applications, is not always desirable or feasible.

It is consequently an object of this invention to provide means for assembling elements of a semiconductor device in accurate, predetermined alignment and in a manner admitting of exact duplication on a mass production basis.

In semiconductor devices of the type described, precise concentric alignment of the emitter and collector electrodes is necessary in order to maintain maximum current gain. It is common practice, due to the inability of present day manufacturing techniques to insure the desired concentricity of electrode elements, to make the collector electrode somewhat larger than ultimately desirable in order to insure that it overlies the critical area of the emitter. This practice, however, results in increasing the collector capacitance, a factor which seriously reduces the operating frequency of high gain transistors. By providing means for aligning the aforesaid elements in heretofore unattainable concentricity, the need for oversized collectors is obviated, with the attendant result that the frequency response of high gain semiconductor devices is materially extended.

It is therefore a further object of this invention to provide means for placing electrode or contact elements on a semiconductor body in precise, concentric relation, and in reproducible fashion.

A fundamental high frequency limitation in semiconductor devices is the transit time dispersion factor which, among other things, is proportional to the base section thickness, or junction separation. This aspect of the high frequency problem has been met by an effort to reduce the junction separation, a problem dependent, inter alia, on the production of planar junctions maintained in exact parallelism. One of the determining features in the formation of such a junction byalloying means, is uniform wetting of the semiconductor by the impurity material, which if accomplished, insures uniform penetration of the alloying front over the entire junction area.

It is consequently a further object of this invention to provide a method of and apparatus for obtaining uniform wetting of the surface of the semiconductor body by the impurity material for the ultimate purpose of increasing the operating frequency range of semiconductor devices made by the alloying or diffusion type process.

An additional consideration bearing on the overall problem of producing concentrically aligned electrode elements for the purpose of insuring the mass production of semiconductor devices having substantially identical operating characteristics, is the ability to produce a defined, reproducible contact area between the body of semiconductive material and impurity metal which area is ultimately determinative of the region undergoing alloying.

It is therefore an additional object of the invention to provide a method of fabrication insuring defined, reproducible areas of contact between a body of semiconductive material and elements to be alloyed therewith.

Of collateral consideration is the degree of breakage occasioned by the manual handling of the thin, fragile semi-conductive material during the aforementioned manufacturing phase. Attempts to solve this particular problem have met with only nominal success because of the inherently uncontrollable factors involved.

It is consequently a still further object of this invention to provide a method of and means for fabricating semi-conductor assemblies which will subject each assembly to precisely controlled, substantially identical forces, for the ultimate purpose of reducing breakage and insuring uniformity of product.

These and other objects within contemplation will be more readily understood by reference to the accompanying detailed description and drawings, in which:

FIGURE 1 is a perspective view of apparatus embodying the present invention;

FIGURES 2(*a*) to 2(*c*) inclusive, are a series of enlarged views graphically illustrating the sequence of operations attendant the positioning of the electrodes on the semiconductor body.

Briefly described, this invention comprises a method of fabricating semiconductive devices, and conjointly a machine constructed and arranged to place contacts; as for example pellets of impurity material, onto opposed faces of a body of semiconductive material in precise concentric relation, and in a manner in which the forces exerted on successive bodies of semiconductive material are identical and reproducible. The mentioned machine is peculiarly adapted to practice the method concepts of the invention, which method basically comprises mechanically adhering pellets of impurity material, in concentrically aligned relation, to opposed faces of a frangible semiconductive body.

Figure 1:
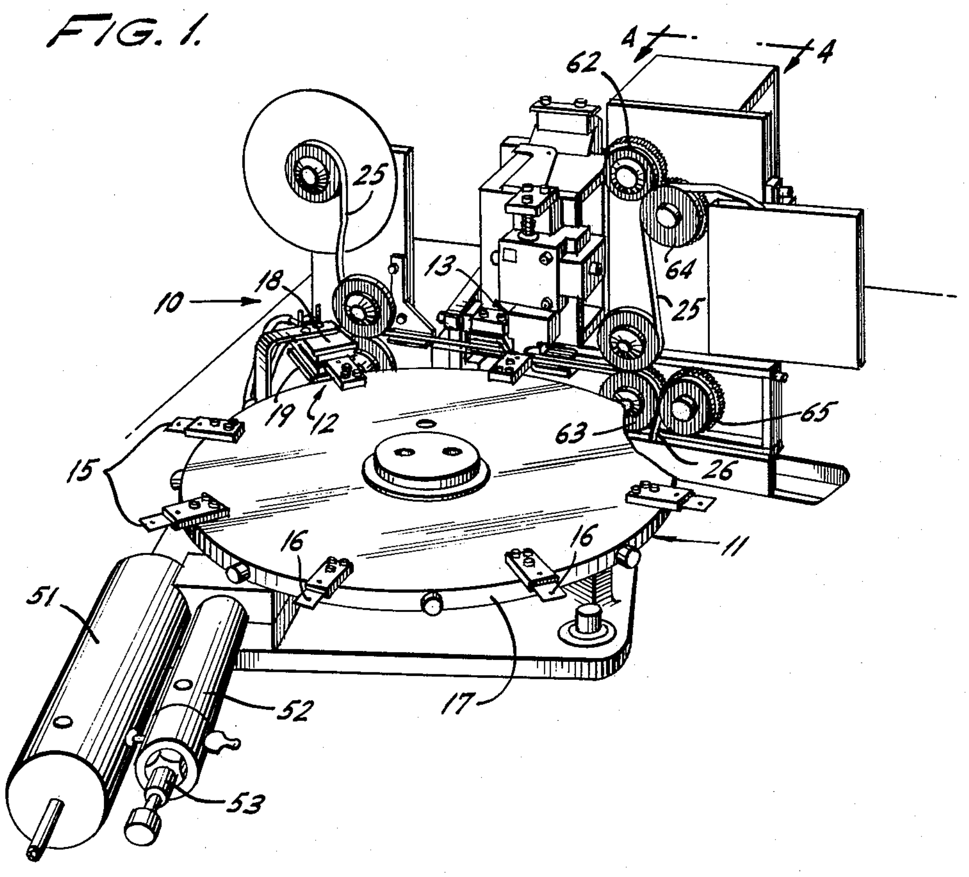

Considering a preferred practice of the invention for illustrative purposes only, FIGURE 1 shows an embodiment of the inventive machine particularly adapted for fabrication of transistors of the alloy junction type, for example, of the type including a semiconductive wafer of n-type, single crystal germanium, to whose opposite sides there are to be affixed two disc-shaped indium electrodes constituting p-type impurity.

Typically, in the semiconductor industry, the electrode on the collector side of the transistor, or the larger of the two, is made of pure indium whereas the electrode applied to the emitter side of the transistor is indium but has added to it a material which enhances injection efficiency such as gallium and possibly a material to assist in the fabrication of the gallium alloy such as silver or gold.

The machine designated generally by the numeral 10, includes indexing means 11, heating means 12, and a pair of reel fed opposed die assemblies 13 and 14, only the upper one of which is shown in FIG. 1. The indexing means 11 carries a plurality of radially extending jig fixtures 15, each containing a suitably apertured nest 16 designed to receive the wafer-like, rectangular blank of semiconductive material, the indexing mechanism being adapted to permit rapid and automatic transfer of the nested blank into predetermined successive registration with elements of the machine with which it is functionally related.

The fabrication of an alloy junction transistor embodying the method teachings of this invention comprises, manually or automatically feeding blanks of germanium into the aforementioned nests 16, the blanks being captively retained within the precisely delineated confines of the nest or template 16 during the entire fabricating procedure. The indexing table 17, carrying the jig fixtures 15, is of the pneumatic-hydraulic driven type in order to insure a positive, uniform speed of transfer in contradistinction to air actuated tables which tend to surge forward at increasing speed until stopped by positive means, the resulting shock being transmitted to the work piece and causing dislodgment or damage thereof. While not necessarily indispensible to the proper functioning of the mechanism, this type of indexing means is preferable.

Figure 2A:
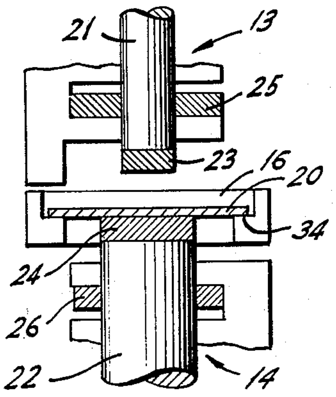
Figure 2B:
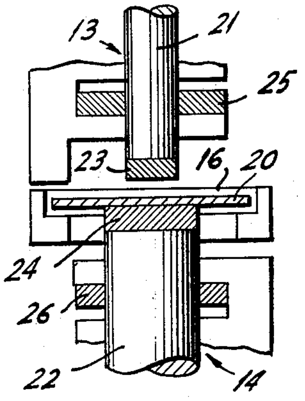

The preferred practice is thoroughly to clean the semiconductor blanks and indium strip as soon as possible immediately prior to their use, this procedure being desirably augmented by heating the wafers prior to pellet placement, this latter step while not indispensible additionally facilitates bonding of the pellet to the semiconductor. Preheating of the semiconductor is conveniently accomplished by transporting the nested wafers, individually and sequentially, into heat exchange relation with the heater shown at 12 consisting of the resistance heating plates 18 and 19. The plates are arranged to admit the forwardly extending, reduced portion of the jig fixture 15 which carries the semi-conductor wafer 20. This arrangement insures rapid uniform heating of the germanium blank. After a precisely timed interval of heating, the blank is indexed into position between the cooperating opposed die assemblies 13 and 14, illustrated in the enlarged showings of FIGURES 2*a* to 2*c*. As the germanium blank is brought into position between the prealigned opposed punches 21 and 22, an immediately preceding blank of germanium is placed in heat exchange relation with the heater 12, thereby insuring a continuous uninterrupted flow of parts. By a series of coordinated actions, to be described, electrodes in the form of pellets 23 and 24 are pierced from reel fed strips of indium 25 and 26 and fixedly positioned in accurate concentric relation on the preheated germanium blank, the concentricity of the bellets being established by the fixed prealignment of the punch members; said pellets of impurity metal uultimately constituting the emitter and collector of an alloy junction transistor.

Figure 3:
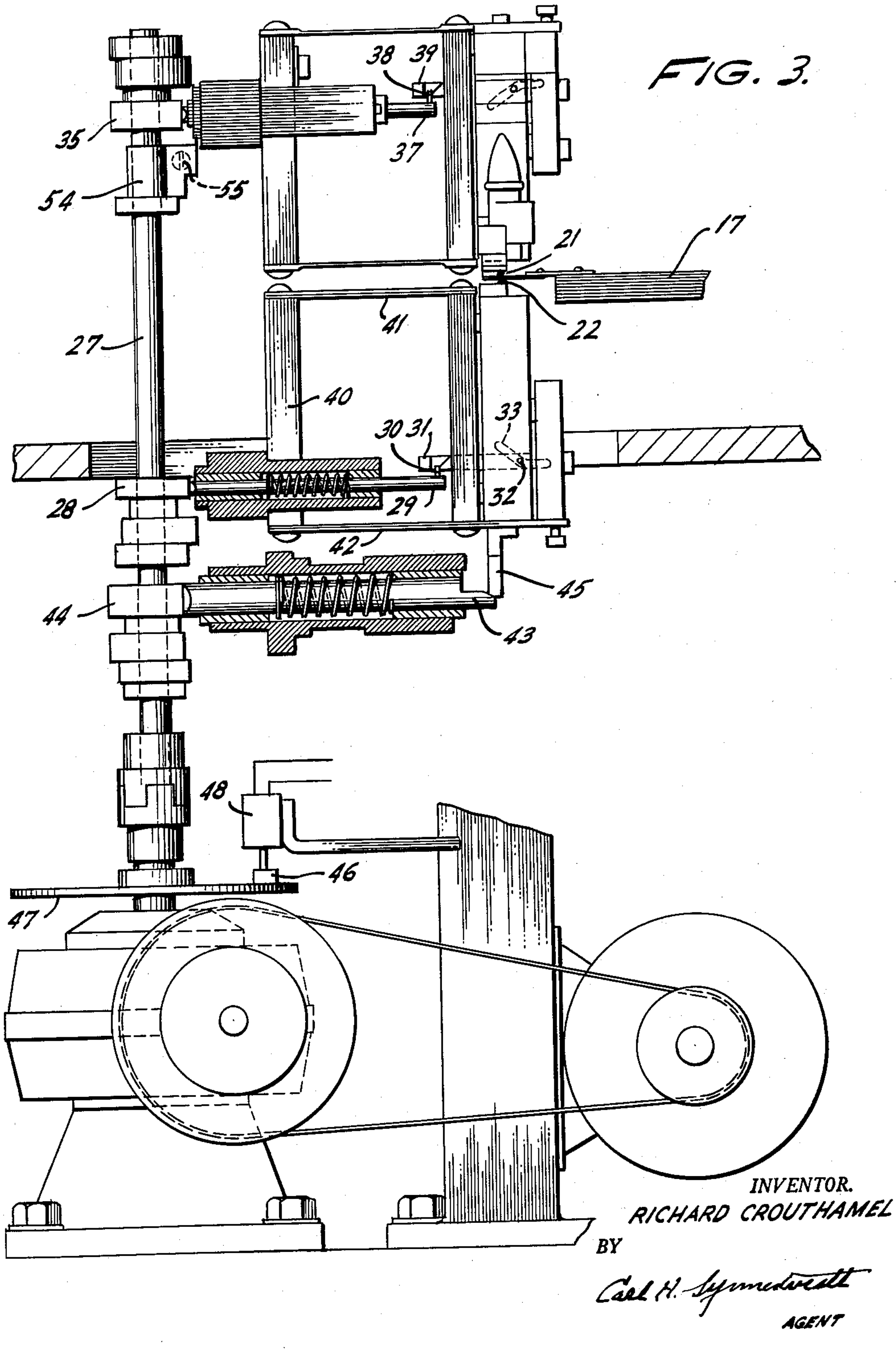
FIGURE 3 is a side elevational view of a portion of the machine shown in FIGURE 1.

Mechanical integration of all operations is obtained by the simple expedient of referencing all motion to the drive shaft 27, shown in FIG. 3, which member mounts a plurality of control cams serving to regulate the various functions of the individual machine members. With the heated germanium blank 20 positioned between the punches 21 and 22, cam 28, seen in FIGURE 3, urges the spring biased follower 29, carrying the upstanding pin 30, into driving abutment with the horizontally translatable member 31. This last mentioned member mounts a pin 32 which, acting through the closed cam track 33 cut in the wall of the punch retaining collet, forces the punch 22 up through the indium ribbon 26 contained within the lower die 14. This action severs a disc-shaped pellet 24 from the strip of indium, carrying it into engagement with the lower surface of the germanium blank 20 positioned within the nest 16. The pellet is advanced sufficiently to lift the germanium blank from the peripheral seat 34, on which it rests, into the position illustrated in FIGURE 2*b*, free of its normal support surface but still within the confines of the nest 16. Substantially concurrent with this phase of operation the upper punch 21, through the agency of linkage similar to that already discussed (the action being initiated by the cam 35) pierces a pellet of indium from the upper strip 25. The indium is of such consistency that it adheres to the face of the punch as it passes through the die 13, and is deposited by the punch onto the upper surface of the germanium blank 20. Placement of the upper electrode is conveniently regulated so as to occur after initial displacement of the germanium blank upward by the lower punch 22, thereby insuring greater control and predictability of the forces obtaining during this period of juncture.

Following electrode placement, the follower arms 37 and 29 are partially retracted so as to withdraw pins 30 and 38 from contact with their abutting surfaces in links 31 and 39. This act effectively isolates the upper and lower die assemblies from the remainder of the system thereby minimizing any extraneous, frictionally induced forces which might deleteriously affect the subsequent compression stage hereinafter described.

Figure 2C:
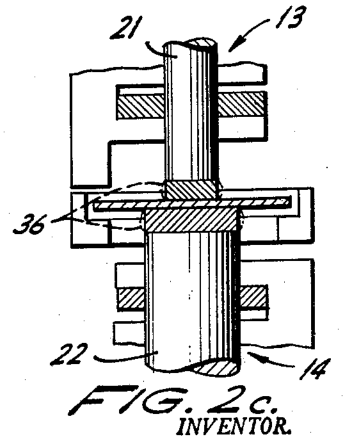

With the electrode-semiconductor assembly poised as shown in FIGURE 2*c*, the lower die assembly 14, which is pivotally suspended from the rigidly mounted standard 40 by means of the flexible metallic plates or reeds 41 and 42, is deflected upward by means of the cam driven follower 43. This follower is displaced radially by the "squeeze-cam" 44 into driving abutment with the depending link 45; the contacting surfaces of the follower 43 and link 45 being so configured that lateral movement of follower 43 results in vertical deflection of the lower die 14. The upper die 13, which is suspended in a similar manner, partially resists this deflection thereby placing the electrode-semiconductor assembly under compression. Typically the collector, conventionally the larger of the two pellets, is made of pure indium while the emitter or smaller pellet may as indicated contain alloys of other materials such as gallium and silver. To produce equal "squashing" of two pellets of dissimilar diameter during the above compression phase their relative viscosities may be readily controlled, as for example, by the addition of silver to the emitter pellet, thus regulating the degree of pellet deformation.

As previously noted, the germanium blank, during the aforesaid compression stage is clear of any peripheral support, the suspension technique here taught insuring maximum concentricity of the forces exerted on the blank during compression to thereby substantially eliminate damaging shearing stresses set up in the germanium blank during this critical phase of fabrication.

This compressive force is for all intents and purposes precisely reproducible, thereby insuring exact control of the pressure exerted on the electrode semiconductor assembly. The separation of the compression stage from the electrode punching phase, frees this critical step in the fabrication process from uncontrollable force factors. It was found that the force required to punch pellets varied according to, among other things, the accumulation of indium on the punching dies and in consequence, the compressive force required to effect proper bounding or wetting of the semiconductor by the electrodes or impurity material was dependent on conditions which were necessarily unpredictable. This separation of functions, in combination with the fact that the compression mechanism is effectively frictionally isolated from the remainder of the system, contributes to a uniformity of product heretofore unattainable and insures complete control over forces impressed on the germanium wafer, thereby minimizing breakage thereof and insuring continuous contact throughout the interfacial area of the electrode and semiconductor, an imperative requisite in attaining planar junctions produced by the alloying or diffusion type process.

Following withdrawal of the upper and lower punches, the indexing table resets and a succeeding preheated blank of germanium is indexed into the final station of operation, while concurrently the completed assembly is transferred to an appropriate point for discharge.

Figure 6:
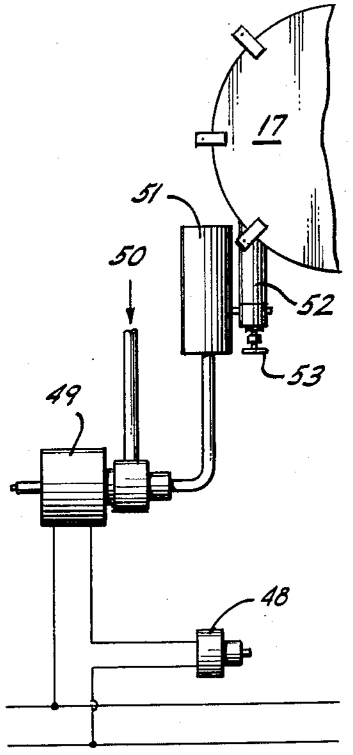
FIGURE 6 is a view of the indexing feed mechanism, with parts omitted to facilitate illustration.

Focusing attention again on FIGURE 3, in conjunction with FIGURE 6, indexing is effected by control of the table 17, through the coaction of cam 46 carried on the shaft-mounted rotatable disc 47, and the normally closed microswitch 48. Control of this table is initiated by camming the microswitch 48 open, thereby deenergizing the normally closed index table solenoid 49, shown in FIGURE 6, which valves off the pressurized air being supplied the indexing mechanism by the line 50, venting the air from the indexing table auxiliary activating cylinder 51 to atmosphere. With the pressure released from the cylinder-piston assembly 52, the spring biased piston 53 is allowed to retract, presetting the indexing mechanism for the next cycle of operation.

The operations of heating and electrode application are carried out in precisely controlled, timed sequence in order to insure reproducible units once optimum operating parameters have been established for any particular set of conditions. This method of fabrication permits precise preregistration between the body of semiconductive material and the machine elements with which they are related in the manufacturing process such that successive units may be transported rapidly and accurately into their respective work stations in a manner which insures heretofore unattainable structural stability of the finished semiconductor device and eliminates the accumulation of error characteristic of alternative methods of manufacture.

Figure 4:
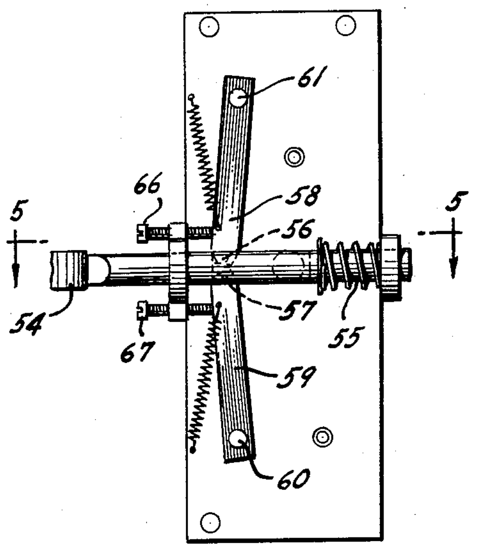
FIGURE 4 is a rear elevational view of the feed mechanism taken at the location and viewed in the directions indicated at 4—4 in FIG. 1.
Figure 5:
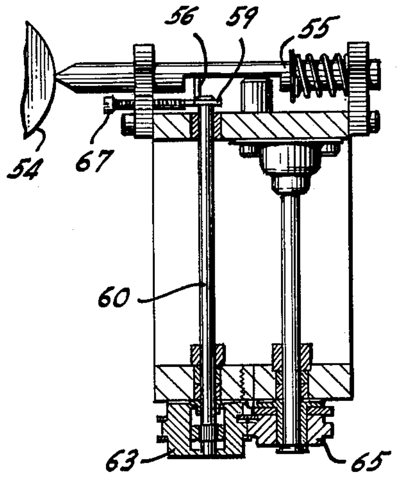
FIGURE 5 is the view taken along the cutting plane 5—5 of FIG. 4.

During the time allocated for indexing, the indium strips are advanced sufficiently to place a fresh charge of indium within the upper and lower die sections of the assemblies 13 and 14. The indium feed is (as are all other operations) cam activated and can best be explained by reference to FIGURE 4 in conjunction with FIGURE 5.

The cam 54 also seen in the upper left section of FIG. 3, working through the follower 55 acts on the pins 56 and 57 associated with the spring biased pivotable links 58 and 59. These links are rigidly mounted on the rotatable shafts 60 and 61 which carry the guide roller-gear assemblies 62 and 63, seen most clearly in FIGURE 1, the gear assemblies being conventionally clutched for unidirectional drive. The feed roller portions of the aforesaid gear-roller assemblies, acting in cooperation with their associated guide rollers 64 and 65, frictionally confine the indium strips, the embossed surfaces of the guide rollers becoming embedded in the indium and serving to provide slip-free advance of the strips in accordance with the arc of motion described by the driving links 58 and 59. These links, by means of adjustable screws 66 and 67, are capable of converting any desired portion of the rectilinear oscillation of the follower 55 into the prescribed arcuate displacement necessary to obtain the proper lineal feed of the indium strips 25 and 26.

The strip feed mechanism rollers are designed to press the indium to uniform thickness, thereby insuring uniform pellet weight, the starting thickness of the indium strip being a little in excess of that ultimately desired to insure the required uniformity.

One particularly efficacious procedure in effecting semiconductor-electrode bonding is to heat the semiconductor body to a temperature in excess of the melting point of the electrode and, then during juncture, extracting heat from the electrode at a rate restricting liquation of the electrode to an amount insufficient to cause deleterious loss of contact definition. When resorting to this particular procedure, in order to control melting of the electrodes, the mass of the punches is chosen so as to permit rapid dissipation of the heat from the electrodes. This rapid dissipation of heat, in conjunction with the technique of initially impressing a nominal compressive force upon the electrode pellet-semiconductor assembly, as by the pressure imposed by the cooperating punch elements 21 and 22, restricts the effects of surface contraction of the partially liquefied pellet—a tendency commonly termed "balling up"—within predetermined desirable limits, mainly to the controllable bulging out indicated in phantom at 36 in FIGURE 2*c*. When the electrode pellets are brought into contact with the body of the semiconductor in the manner above described, any tendency of the pellet to change shape is restricted by this complementary combination of actions which serve to insure the practical attainment of a definitive area of juncture capable of duplication on a mass production basis. It will, of course, be understood that electrode-semiconductor juncture can be attained without preheating, and in those instances employing preheating may be accomplished without the imposition of external forces restricting surface contraction by merely exerting more precise control over the thermal gradients to which the electrode or impurity pellet is exposed.

While preferred embodiments, illustrative of the method and apparatus concepts of the present invention have been depicted and described, it will be understood by those skilled in the art that the invention is susceptible of changes and modifications without departing from the essential concepts thereof, and that such changes and modifications are contemplated as come within the terms of the appended claims.

I claim:

1. The method of automatically fabricating semiconductor devices, which comprises: heating a body of semiconductive material preparatory to applying contacts thereto to a temperature in excess of the melting point of the contact material; punching contacts in opposed, prealigned pairs from impurity material; transporting said contacts sequentially into abutment with opposed faces of said semiconductive material to support said body solely upon one of said contacts prior to applying the other of said contacts to said body; simultaneously pressing the opposed contacts, against said body at a time substantially coincident with their placement upon and partial liquification by, said heated body and conducting heat from said contacts thereby to utilize both pressing and heat conduction to prevent loss of dimensional form of said contacts.

2. The method of automatically fabricating semiconductor devices which comprises: heating a body of semiconductive material preparatory to applying contacts thereto to a temperature in excess of the melting point of the contacting surface of the contact material and to a point such that the heat content of said body is sufficient to produce only partial liquification of said contacts on application thereof to said body; sizing impurity material to predetermined thickness through the intermediation of automatic feed means immediately prior to applying contacts to said body; punching contacts in opposed, prealigned pairs from the sized impurity material; and transporting said contacts sequentially into abutment with opposed faces of said body of semiconductive material in such manner as to support said body solely upon one of said contacts before the application of the other of said contacts to said body.

3. The method of automatically fabricating semiconductor devices which comprises: heating a body of semiconductive material preparatory to applying contacts thereto to a temperature in excess of the melting point of the contact material; punching contacts in opposed, prealigned pairs from blanks of impurity material; transporting said contacts sequentially into abutment with opposed faces of said body of semiconductive material in such manner as to support said body solely upon one of said contacts before application of the other of said contacts to said body; and immediately said contacts are placed on said body conducting heat from said contacts at a rate sufficient to prevent loss of contact definition.

4. The method of automatically fabricating semiconductor devices which comprises: heating a body of semiconductive material preparatory to applying contacts thereto to a temperature in excess of the melting point of the contacting surface of the contact material and to a point such that the heat content of said body is sufficient to produce only partial liquification of said contacts on application thereof to said body; punching contacts in opposed, prealigned pairs from impurity material; transporting said contacts sequentially into abutment with opposed faces of said body of semiconductive material in such manner as to support said body solely upon one of said contacts before the application of the other of said contacts to said body; and pressing the opposing, partially liquified contacts simultaneously against said heated body.

5. The method of automatically fabricating semiconductor devices, which comprises: heating a body of semiconductive material preparatory to placing contacts thereon to a temperature in excess of the melting point of the contacting surface of the contact but to a point such that the heat content of said body results in only partial liquification of said contact on application thereof to said body; punching contacts in opposed, prealigned pairs from blanks of impurity material; and mechanically applying said contacts to said heated body.

References Cited in the file of this patent

UNITED STATES PATENTS

| | | |
|---|---|---|
| 2,308,606 | Ingerson | Jan. 19, 1943 |
| 2,381,025 | Addink | Aug. 7, 1945 |
| 2,817,607 | Jenny | Dec. 24, 1957 |

FOREIGN PATENTS

| | | |
|---|---|---|
| 782,035 | Great Britain | Aug. 28, 1957 |